United States Patent [19]

Sakamoto et al.

[11] 4,251,593

[45] Feb. 17, 1981

[54] HEAT-SENSITIVE RECORDING SHEET

[75] Inventors: Hiroshi Sakamoto, Handa; Minoru Nomura; Minoru Hagiri, both of Shizuoka, all of Japan

[73] Assignee: Ricoh Company, Ltd., Tokyo, Japan

[21] Appl. No.: 59,299

[22] Filed: Jul. 20, 1979

[30] Foreign Application Priority Data

Aug. 1, 1978 [JP] Japan .................................. 53-93951

[51] Int. Cl.$^3$ .......................... B41M 5/18; B32B 9/06

[52] U.S. Cl. .................................... 428/411; 427/145; 427/148; 427/151; 428/464; 428/467; 428/486; 428/488; 428/535; 428/537; 428/913

[58] Field of Search ............... 428/913, 488, 486, 535, 428/537, 464, 467, 411; 427/145, 148, 151

[56] References Cited

U.S. PATENT DOCUMENTS 3,859,111 1/1975 Takanishi ............................ 428/913

3,944,695 3/1976 Kosaka ................................ 428/488

4,032,690 6/1977 Kohmura ............................ 428/913

4,096,314 6/1978 Cespon ................................ 428/913

4,168,845 9/1979 Oeda .................................. 428/913

*Primary Examiner*—Ellis P. Robinson

*Attorney, Agent, or Firm*—Blanchard, Flynn, Thiel, Boutell & Tanis

[57] ABSTRACT

The present invention provides a heat-sensitive recording sheet which is composed of a support and a heat-sensitive layer formed on said support, said heat-sensitive layer consisting essentially of a color-developable substance and an organic acid substance capable of making said color-developable substance develop a color when heated and containing at least one member selected from the group consisting of condensate of higher fatty acid amide and formaldehyde and condensate of higher fatty acid and ethylene diamine and at least one member selected from the group consisting of vegetable waxes and mineral waxes.

10 Claims, No Drawings

HEAT-SENSITIVE RECORDING SHEET

BACKGROUND OF THE INVENTION (a) Field of the Invention

The present invention relates to a heat-sensitive recording sheet, and particularly it relates to a heat-sensitive recording sheet which is composed of a support and a heat-sensitive layer formed thereon, said heat-sensitive layer consisting essentially of a color-developable substance (developer) which is normally colorless or light-colored and an organic acid substance capable of making said color-developable substance develop a color when heated and also containing a specific wax.

(b) Description of the Prior Art

With the recent social need for increase in the amount of information, economy of resources, labor-saving, prevention of public nuisance, etc., utilization and improvement of varieties of recording systems are in progress in the field of the information recording art. Especially, the heat-sensitive recording system has merits such that (i) it can dispense with the developing process as it can develop a color upon heating, (ii) the relevant apparatus is easy to assemble and maintain, (iii) the heat-sensitive recording sheet for use therein resembles ordinary papers in feel and is rather moderate in cost, etc., and therefore it has been put to practical use as the printer part for computer outputs, portable electronic computer, etc., the recorder part of metrological instruments for medical care, facsimile, automatic booking machine, heat-sensitive copying apparatus, etc.

As the heat-sensitive recording sheet useful for these purposes, there are known such ones as disclosed in Japanese Patent Publication No. 4160/1968, Japanese Patent Publication No. 14039/1970, etc., but these heat-sensitive recording sheets in the prior art still have defects such as follows:

First, since they are inferior in heat-responsiveness, they cannot bring about a sufficient recording density adapted to the speed-up of the recording. Second, the heat-sensitive composite contained therein is fused at the time of recording and sticks to the thermal pen or thermal head, and as a result, inconvenience is caused in feeding the recording paper, the sticking substance is transferred to the recording paper to cause the so-called "tailing" phenomenon, and moreover, accumulation of the sticking substance lower the recording density, entailing indistinctness of the recorded image.

These properties are collectively called "head-matching" and constitute the most important factor to be taken into account at the time of examining a heat-sensitive recording sheet. There have admittedly been proposed various means for improving these properties, such as disclosed in Japanese Patent Open No. 19231/1973, Japanese Patent Publication No. 27599/1976, etc. That is, Japanese Patent Open No. 19231/1973 disclosed that the use of a wax having a melting point in the range of from 40° to 100° C. as carrier can enhance the heat-responsiveness. And, Japanese Patent Publication No. 27599/1976 disclosed that joint use of a higher fatty acid and a petroleum wax can improve the heat-responsiveness and alleviate the sticking of fused composite onto the thermal head.

However, as a matter of fact, the means disclosed in these literatures still leave something to be desired in order to obtain a fully satisfactory heat-sensitive recording sheet. In other words, from the view point of ensuring the recording fidelity and ameliorating the indistinctness of the recorded image arising from the sticking of fused composite onto the thermal pen at the time of high-speed recording by a thermal pen recorder, such as an electrocardiograph, etc., in which a tip-type pen made of a thermal head type resistor in now taking the place of a metal rod pen, a satisfactory result can, in fact, not be expected from only the arts disclosed in these literatures.

SUMMARY OF THE INVENTION

In view of the existing circumstances as above, the present inventors have made a series of studies and examinations in order to obtain a heat-sensitive recording sheet having a wide range of use in the thermal printer, thermal pen recorder, etc. As a result, they have come to the finding that application of a heat-sensitive layer consisting essentially of a color-developable substance and an organic acid substance capable of making said color-developable substance develop a color when heated (to wit, a developer), with the addition of a specific wax, can eliminate the aforementioned defects of the prior art. The present invention has been accomplished on the basis of this finding.

A primary object of the present invention is to provide a heat-sensitive recording sheet which is superior in heat-responsiveness and high in recording density. Another object of the present invention is to provide a heat-sensitive recording sheet which renders a sufficiently distinct image even at the time of high-speed recording. A further object of the present invention is to provide a heat-sensitive recording sheet which is free from such a trouble that the heat-sensitive materials contained therein are fused at the time of recording and stick onto the thermal head. A still further object of the present invention is to provide a heat-sensitive recording sheet which is free from change in quality despite prolonged storage.

In other words, the present invention provides a heat-sensitive recording sheet, which is composed of a support and a heat-sensitive layer formed thereon, said heat-sensitive layer consisting essentially of a color-developable substance which is normally colorless or light-colored and an organic acid substance which is capable of making said color-developable substance develop a color when heated, and is characterized in that said heat-sensitive layer contains at least one member selected from the group consisting of condensate of higher fatty acid amide and formaldehyde and condensate of higher fatty acid and ethylene diamine and at least one member selected from the group consisting of vegetable waxes and mineral waxes.

That is, a heat-sensitive recording sheet according to the present invention comprises a support (consisting of paper, synthetic paper, synthetic resin film, metal-laminated paper or the like) and a heat-sensitive layer having a specific composition as formed on said support.

Inasmuch as this heat-sensitive layer contains at least one kind of wax selected from the group consisting of condensate of higher fatty acid amide and formaldehyde and condensate of higher fatty acid and ethylene diamine (this wax is hereinafter referred to as ingredient C), it is superior in heat-responsiveness and renders a recorded image of high density. However, in the case where this ingredient C is simply mixed in the color developable substance (hereinafter referred to as ingredient A) and the organic acid substance capable of making the color-developable substance develop a color (hereinafter referred to as ingredient B), the property of sticking to the thermal pen and thermal head cannot be sufficiently ameliorated.

While, in the case where at least one kind of wax selected from the group consisting of vegetable waxes and mineral waxes (hereinafter referred to as ingredient D) is added thereto, the sticking of fused composite onto the thermal head and the abrasion of the thermal pen and thermal head can be drastically ameliorated. On this occasion, the use of a petroleum wax such as polyethylene, polypropylene, paraffin wax or the like is undesirable because it would rather induce said sticking to the thermal head and accordingly the adhesion of residuary substances thereto would increase.

As the ingredient C (i.e., a kind of wax selected from the group consisting of condensate of higher fatty acid amide and formaldehyde and condensate of higher fatty acid and ethylene diamine), there can be cited condensate of stearic acid amide and formaldehyde (methylene-bis-stearoamide $C_{17}H_{35}CONHCH_2NHCOC_{17}H_{35}$), condensate of stearic acid amide and formaldehyde (methylol stearoamide $C_{17}H_{35}CONHCH_2OH$), condensate of palmitic acid amide and formaldehyde (methylol palmitoamide $C_{15}H_{31}CONHCH_2OH$), condensate of stearic acid and ethylene diamine (ethylene-bis-stearoamide $C_{17}H_{35}CONHCH_2CH_2NHCOC_{17}H_{35}$), condensate of lauric acid and ethylene diamine (ethylene-bis-laurylamide $C_{11}H_{23}CONHCH_2CH_2NHCOC_{11}H_{23}$), etc., but the applicable wax is not limited to the foregoing providing the melting point should be in the range of from 80° to 150° C.

As the ingredient D (i.e., a kind of wax selected from the group consisting of vegetable waxes and mineral waxes), there can be cited carnauba wax, sugar cane wax and cotton wax collected directly from vegetables, montan wax extracted from brown coal resulting from the partial decomposition of vegetable matter and their modifications.

The color-developable substance (i.e., ingredient A) for use in the present invention which is normally colorless or light-colored is a leuco-base such as triphenyl methane, fluorane, phenothiazine, Auramine, spiropyrane, etc., and to cite concrete examples, there are 3,3-bis(p-dimethyl aminophenyl)-6-dimethyl aminophthalide, 3,3-bis(p-dimethyl aminophenyl)phthalide, 3,3-bis(p-dimethyl aminophenyl)-6-diethyl aminophthalide, 3,3-bis(p-dimethyl aminophenyl)-6-chlorophthalide, 3-(N-p-tolyl-N-ethyl amino)-6-methyl-7-(N-phenyl amino) fluorane, 3-diethyl amino-7-chlorofluorane, benzoyl Leucomethylene Blue, 6'-chloro-8'-methoxybenzoindolino-pyrylospiran, 6'-bromo-8'-methoxy-benzoindolino-pyrylospiran, 2-[3,6-bis(diethyl amino)-9-(O-chloroanilino)xanthyl]-benzoic lactam, 2-{N-(3'-trifluoromethyl phenyl)amino}-6-diethyl aminofluorane, etc.

but the applicable substance is not limited to the foregoing.

As the organic acid substance (i.e., ingredient B) for use in the present invention, there can be cited α-naphthol, β-naphthol, 4-t-butyl phenol, 4-t-octyl phenol, 4-phenyl phenol, 2,2-bis(p-hydroxyphenyl)propane, 2,2-bis(p-hydroxyphenyl)butane, 4,4-cyclohexilidene diphenol, 2,2-bis(2,5-dibromo-4-hydroxyphenyl)propane, 4,4'-isopropylidene-bis(2-t-butyl phenol), 2,2-methylene-bis(4-chlorophenol), etc., but the applicable substance is not limited to the foregoing.

A heat-sensitive recording sheet prepared by forming a heat-sensitive layer comprising the aforementioned ingredient A, ingredient B, ingredient C, ingredient D and an inorganic filler (hereinafter referred to as ingredient E) such as kaolin, calcium carbonate, etc. is admittedly well servable for practical use, but the present inventors have conducted further examinations and come to the finding that, mixing of a binder composed of at least one member selected from the group consisting of starches and their derivatives together with dialdehyde starch in the heat-sensitive layer can prevent the sticking of fused composite onto the thermal head more effectively and enhance the color developability.

In this connection, Japanese Patent Publication No. 31500/1956 discloses a heat-sensitive layer comprising (a) a color-developable substance, (b) biphenyls, (c) a water-soluble bonding agent containing carboxyl radical, (d) a water-resisting agent for making said bonding agent waterproof, (e) powdery starch, (f) a petroleum wax and (g) a higher fatty acid amide type wax together with a metallic salt of higher fatty acid, but a heat-sensitive layer of such a composition cannot produce a satisfactory heat-sensitive recording sheet.

On the contrary, when a binder (i.e., ingredient F) such as described in the foregoing is applied, there can be obtained a very satisfactory heat-sensitive recording sheet. As the starch or derivative thereof for use in the present invention, there can be cited maize starch, wheat starch, sweet potato starch and oxidized starches obtained by oxidizing these starches with sodium hypochlorite. Further, the aforesaid dialdehyde starch can be easily obtained by oxidizing these starches with periodate.

In order to prepare a heat-sensitive recording sheet according to the present invention, the ingredient A, ingredient B, ingredient C, ingredient D and an inorganic filler as ingredient E (as the filler for use herein, clay, calcium carbonate, magnesium carbonate, kaolin, etc. are applicable, but it is preferable to use kaolin or calcium carbonate having particle size of 0.05 to 5.0 μm) are dispersed, individually or upon mixing together excepting ingredient A, by means of a disperser such as ball-mill, attriter, sand-mill, etc. after adding a protective colloidal substance, a surface active agent, etc. and, if necessary, further adding a binder (i.e., ingredient F) thereto, whereby a heat-sensitive layer forming liquid is prepared. Besides, this heat-sensitive layer forming liquid can be mixed with some defoaming agent, wetting agent, and further organic pigment, bridging agent, etc.

Referring to the appropriate mixing ratio of these ingredients C, D and E on this occasion, as for ingredient C, it is in the range of from 0.1 to 5.0 times, preferably from 0.2 to 3.0 times, as much as ingredient A by weight, as for ingredient D, it is in the range of from 0.2 to 6.0 times, preferably from 0.2 to 4.0 times, as much as ingredient A by weight, as for ingredient E, it is in the range of from 0.5 to 5.0 times as much as ingredient A by weight, and as for ingredient F, it is in the range of from 10 to 50% by weight of the heat-sensitive layer.

At the time of using ingredient F in preparing this heat-sensitive layer forming liquid, it is preferable to apply it upon converting into paste through the process of dispersing a starch (inclusive of derivatives of starch) in water and heating the resulting dispersion up to a temperature of 0° to 95° C. And, in the case of dialdehyde starch which is difficult to dissolve under the same conditions as that in the case of converting ordinary starches into paste, it is advisable to apply it upon converting into paste through the process of adding a buffer solution made of sodium acetate, borax or the like and heating the resulting mixture up to a temperature of 80° to 95° C.

Subsequently, the thus obtained heat-sensitive layer forming liquid is coated on a support to the extent of 4 to 10 g/m$^2$ in terms of solid matter and is dried. It is more advantageous to subject the heat-sensitive layer of the resulting heat-sensitive recording sheet to the surface treatment so as to attain the Beck's smoothness of 1,000 to 1,800 seconds.

That is, when the heat-sensitive layer is subjected to the surface treatment with a gloss calendar, a super calendar or the like so as to attain the Beck's smoothness of 1,000 to 1,800 seconds, the heat-responsiveness and the recording fidelity improve remarkably in the thermal pen recorder, high speed serial printer, etc. in particular. Even when the Beck's smoothness is in the range of from 100 to 500 seconds or thereabouts, the heat-sensitive layer displays a superior heat-responsiveness, and yet by virtue of the surface treatment to attain the Beck's smoothness of more than 1,000 seconds, the recording fidelity is further enhanced. However, if the Beck's smoothness exceeds 1,800 seconds, the ground of the heat-sensitive recording sheet will be exposed under pressure and becomes excessively transparent, thereby impairing the commercial value thereof.

A heat-sensitive recording sheet of the present invention does not feature a mere accumulation of the effects of individual materials constituting the heat-sensitive layer thereof, but it is characterized in that a synergistic effect of all ingredients can be manifested, thereby accomplishing the intended objects.

DESCRIPTION OF THE PREFERRED EMBODIMENTS

EXAMPLE 1

Two varieties of mixtures having the following composition respectively were pulverized within a magnetic ball-mill for a day, whereby liquids [A$_1$] and [E$_1$] were prepared.

Composition of liquid [A$_1$]

| | |
|---|---|
| 2-{N-(3'-trifluoromethyl phenyl)amino}-6-diethyl aminofluorane | 150 g |
| 5% aqueous solution of polyvinyl alcohol (POVAL 205, the manufacture of KURARE K.K.) | 150 g |
| water | 200 g |

Composition of liquid [E$_1$]

| | |
|---|---|
| talc | 150 g |
| 5% aqueous solution of methyl cellulose (METHOLOSE SM-15, the manufacture of SHINETSU KAGAKU K.K.) | 150 g |
| water | 200 g |

Further, 3 varieties of mixtures having the following composition respectively were pulverized within a laboratory attriter for 2 hours, whereby liquids [B$_1$], [C$_1$] and [D$_1$] were prepared.

Composition of liquid [B$_1$]

| | |
|---|---|
| 2,2'-bis(p-hydroxyphenyl)propane | 120 g |
| 5% aqueous solution of polyvinyl alcohol | 120 g |
| water | |

Composition of liquid [C$_1$]

| | |
|---|---|
| condensate of stearic acid amide and formaldehyde (in the presence of basic catalyst, $C_{17}H_{35}CONHCH_2OH$) | 80 g |
| 5% aqueous solution of methyl cellulose | 80 g |
| nonionic surface active agent (adduct of alkylphenyl to ethylene oxide: NOIGEN EA-80, the manufacture of DAIICHI KOGYO SEIYAKO K.K.) | 2 g |
| water | 238 g |

Composition of liquid [D$_1$]

| | |
|---|---|
| carnauba wax | 80 g |
| 5% aqueous solution of methyl cellulose | 80 g |
| nonionic surface active agent | 2 g |
| water | 238 g |

Subsequently, a heat-sensitive layer forming liquid was prepared by mixing these liquids [A$_1$] through [E$_1$] with 20% aqueous solution of polyvinyl alcohol (namely, POVAL 205, the manufacture of KURARE K.K.) at the following ratio.

| | |
|---|---|
| liquid [A$_1$] | 20 g |
| liquid [B$_1$] | 40 g |
| liquid [C$_1$] | 60 g |
| liquid [D$_1$] | 80 g |
| liquid [E$_1$] | 40 g |
| 20% aqueous solution of polyvinyl alcohol | 115 g |

Then, this heat-sensitive layer forming liquid was coated on a commercial slick paper (weighing 53 g/m$^2$) to the extent of 7 to 8 g/m$^2$ in terms of dry solid matter by means of a wire bar, and was dried. Thereafter, the thus coated stick paper was further subjected to the surface treatment with a calendar so as to attain the Beck's smoothness of 200 to 400 seconds, whereby a heat-sensitive recording sheet was prepared.

When this heat-sensitive recording sheet was tested, the result was as shown in the following Table-1. As is evident from Table-1, this heat-sensitive recording sheet was high in heat-responsiveness, free from such phenomena as sticking of fused composite, adhesion of residuary substances, tailing of recorded image, ghaust, etc., and superior in head-matching property.

In this context, the method of test applied was as follows.

(1) The test of the heat-responsiveness was conducted by the use of heat gradient Tester equipped with a heated iron piece (the manufacture of Toyo SEIKI K.K. ) and through the procedure that said iron piece as regulated to have a constant temperature was kept in contact with the heat-sensitive recording sheet under a pressure of 2.0 Kg/cm$^2$ for 1 hour to make it develop a color, the density of the color thus developed was measured with Macbeth's reflection densitometer, the saturated density thus obtained was expressed by Dmax., and the heat-responsiveness was expressed by the temperature at the time of attaining a density of 0.80 based on this Dmax. This means that the higher is said temperature, the more superior is the heat-responsiveness.

(2) The sticking of fused composite was examined by conducting solid printing with the overall width of the thermal head, and as for the adhesion of residuary substances, the tailing of recorded image, the ghaust and the distinctness of recorded image were evaluated by employing 20 pieces of Fascimile Test Charts for comparison.

(3) The recording density was evaluated by measuring the density of the solid area of the recorded image according to the foregoing charts by the use of Macbeth's densitometer.

EXAMPLE 2

A mixture having the following composition was pulverized within a laboratory attriter for 2 hours, whereby liquid [C-D] was prepared.

Composition of liquid [C-D]

| | |
|---|---|
| montan wax modification (S-Wax, the manufacture of HOECHST JAPAN COMPANY) | 40 g |
| condensate of stearic acid and ethylene diamine ($C_{17}H_{35}CONHCH_2CH_2NHCOC_{17}H_{35}$) | 40 g |
| 5% aqueous solution of methyl cellulose | 80 g |
| nonionic surface active agent | 2 g |
| water | 238 g |

Subsequently, a heat-sensitive layer forming liquid was prepared by combining this liquid [C-D], liquids [$A_1$], [$B_1$] and [$E_1$] of Example 1 and 20% aqueous solution of polyvinyl alcohol at the following ratio, and by applying the same procedure as in Example 1, a heat-sensitive recording sheet was prepared.

| | |
|---|---|
| liquid [$A_1$] | 20 g |
| liquid [$B_1$] | 40 g |
| liquid [C-D] | 140 g |
| liquid [$E_1$] | 40 g |
| 20% aqueous solution of polyvinyl alcohol | 115 g |

When this heat-sensitive recording sheet was subjected to the same test as in Example 1, the result was as shown in Table-1, attesting to its superior quality as heat-sensitive recording sheet.

COMPARATIVE EXAMPLE 1

A mixture having the following composition was pulverized within a laboratory attriter for 2 hours, whereby liquid [$C_2$] was prepared.

Composition of liquid [$C_2$]

| | |
|---|---|
| stearic acid amide | 80 g |
| 5% aqueous solution of methyl cellulose | 80 g |
| nonionic surface active agent | 2 g |
| water | 238 g |

Subsequently, a heat-sensitive layer forming liquid was prepared by using this liquid [$C_2$] together with liquids [$A_1$], [$B_1$] and [$E_1$] of Example 1 at the following ratio, and then by applying the same procedure as in Example 1, a heat-sensitive recording sheet was prepared.

| | |
|---|---|
| liquid [$A_1$] | 20 g |
| liquid [$B_1$] | 40 g |
| liquid [$C_2$] | 60 g |
| liquid [$E_1$] | 40 g |
| polyethylene wax emulsion (solid content: 30%) (namely, POLYLON A, the manufacture of CHUKYO YUSHI K.K.) | 53 g |
| 2% aqueous solution of polyvinyl alcohol | 115 g |

When this heat-sensitive recording sheet was subjected to the same test as in Example 1, the result was as shown in Table-1.

COMPARATIVE EXAMPLES 2 THROUGH 8

Seven varieties of comparative heat-sensitive recording sheets were prepared by applying the same procedure as in Example 1 save for changing the wax (ingredient C and/or ingredient D). When these heat-sensitive recording sheets were subjected to the same test as in Example 1, the result was as shown in Table-1, respectively.

TABLE 1

| | | Result of test on quality | | | | | | |
|---|---|---|---|---|---|---|---|---|
| | | | | | Head-matching Property | | | |
| | Ingredient C and/or Ingredient D | D max. | Heat-responsiveness | Recording density | Sticking | Adhesion of residuary substance | Tailing of recorded image | Ghaust; distinctness of recorded image |
| Example 1 | condensate of stearic acid amide and formaldehyde and carnauba was | 1.15 | 91° C. | 1.11 | ◎ | ◎ | ◎ | ◎ |
| Example 2 | condensate of stearic acid and ethylene diamine and montan wax modification | 1.16 | 98 ° C. | 1.05 | ◎ | ◎ | ◎ | ◎ |
| Comparative Example 1 | stearic acid amide and polyethylene wax | 1.16 | 91° C. | 1.11 | ○ | (Δ) | ○ | Δ |
| Comparative Example 2 | carnauba wax | 1.16 | 120° C. | 0.90 | ○ | ○ | ◎ | (Δ) |
| Comparative Example 3 | condensate of srearic acid amide and formaldehyde ($C_{17}H_{35}CONHCH_2OH$) | 1.16 | 91° C. | 1.11 | Δ | (Δ) | Δ | (Δ) |
| Comparative Example 4 | stearic acid amide | 1.17 | 90° C. | 1.12 | x | Δ | Δ | Δ |
| Comparative Example 5 | calcium stearate | 1.17 | 125° C. | 0.85 | x | x | x | x |
| Comparative | | | | | | | | |

TABLE 1-continued

| | Ingredient C and/or Ingredient D | Result of test on quality | | | | | | |
|---|---|---|---|---|---|---|---|---|
| | | | | Head-matching Property | | | | |
| | | D max. | Heat-re-spon-sive-ness | Re-cord-ing den-sity | Stick-ing | Adhe-sion of resid-uary sub-stance | Tail-ing of rec-orded image | Ghaust; dis-tinct-ness of recorded image |
| Example 6 | polyethylene wax | 1.14 | 110° C. | 0.95 | Δ⃝ | Δ | ○ | Δ⃝ |
| Comparative Example 7 | montan wax midification | 1.15 | 120° C. | 0.93 | ○ | ○ | ◎ | Δ⃝ |
| Comparative Example 8 | parrafin wax and $C_{17}H_{35}CONHCH_2OH$ | 1.15 | 91° C. | 1.10 | ○ | Δ⃝ | ○ | Δ |

(Remark)

Marks ◎, ○, Δ⃝, Δ and x represent the values as graded from "satisfactory" down to "unsatisfactory".

EXAMPLE 3

Two varieties of mixtures having the following composition respectively were pulverized within a magnetic ball-mill for 1 day, whereby liquids [$A_2$] and [$E_2$] were prepared.

Composition of liquid [$A_2$]

| | |
|---|---|
| 3,3-bis(p-dimethyl aminophenyl)-6-dimethyl aminophenyl | 150 g |
| 5% aqueous solution of polyvinyl alcohol (namely, POVAL 205, the manufacture of KURARE K.K.) | 150 g |
| waer | 200 g |

Composition of liquid [$E_2$]

| | |
|---|---|
| kaolin | 150 g |
| 5% aqueous solution of methyl cellulose (namely, METHOLOSE SM-15, the manufacture of SHINETSU KAGAKU K.K.) | 150 g |
| water | 200 g |

Subsequently, a heat-sensitive layer forming liquid was prepared by compounding these liquids [$A_2$] and [$E_2$], liquids [$B_1$], [$C_1$] and [$D_1$] of Example 1, 20% aqueous solution of oxidized starch and 10% aqueous solution of dialdehyde starch at the following ratio.

| | |
|---|---|
| liquid [$A_2$] | 20 g |
| liquid [$B_1$] | 40 g |
| liquid [$C_1$] | 60 g |
| liquid [$D_1$] | 80 g |
| liquid [$E_2$] | 40 g |
| 20% aqueous solution of oxidized starch | 60 g |
| 10% aqueous solution of dialdehyde starch | 120 g |

Then, this heat-sensitive layer forming liquid was coated on a commercial slick paper (weighing 53 g/m$^2$) to the extent of 5 to 6 g/m$^2$ in terms of dry solid matter by means of a wire bar and was dried. Thereafter, the thus coated slick paper was further subjected to the surface treatment with a calendar so as to attain the Beck's smoothness of 1,100 to 1,200 seconds, whereby a heat sensitive recording sheet was prepared.

When this heat-sensitive recording sheet was tested, the result was as shown in the following Table-2. As is evident from Table-2, this heat-sensitive recording sheet proved to be superior in heat-responsiveness, high-speed recording property and fidelity in recording, and free from causing the sticking of fused composite to the thermal head and the abrasion of the thermal head.

In Table-2, there were collectively shown the case wherein a heat-sensitive recording sheet was subjected to the surface treatment with a calendar to the extent of the Beck's smoothness of 500 to 550 seconds as Example 4 and the case wherein the same recording sheet was subjected to the surface treatment with a calendar to the extent of the Beck's smoothness of 300 to 400 seconds as Example 5.

In this context, the method of test applied was as follows:

(1) The heat-responsiveness was evaluated in the same way as in Example 1.

(2) The high-speed recording property and the recording fidelity were evaluated by comparing the result of the color-developability test conducted on each recording sheet by using a linear recorder equipped with an IC pen (namely, Thermal Pen Recorder, the manufacture of WATANABE SOKKI SEISAKUSHO, Ltd.) applying 50 Hz sine wave as input and setting the feed rate of heat-sensitive recording sheet at 500 mm/sec.

(3) The abrasion hardness was evaluated through a running test conducted on each recording sheet by employing the linear recorder mentioned in (2) above, applying 60 Hz sine wave as input and setting the feed rate of heat-sensitive recording sheet at 100 mm/sec., and was expressed by the distance of the travel in terms of kilometer made by the IC pen until its resistance increased by about 10% to deteriorate the drawing efficiency thereof.

(4) The sticking of fused composite onto the thermal head and the distinctness of recorded image were evaluated by comparing the result of the test conducted on each recording sheet by employing a trial printer equipped with a segment-type thick film head (manufactured by NIPPON TOKI K.K.) and a baby printer PC-100 (the manufacture of TEXAS INSTRUMENT Inc.) for use in portable electronic computer.

(5) The water-resisting property was evaluated by comparing the result of measurement of the density diminution rate of each recording sheet after dipping in water for 5 minutes and then rubbing the surface of the heat-sensitive layer with absorbent cotton two times.

TABLE 2

| | Ingredient C and Ingredient D | Ingredient E | Ingredient F | Smoothness | Result of test on quality: Heat-responsiveness | High speed recording property | Recording fidelity | Sticking to thermal head | Abrasion hardness | Water-resisting property |
|---|---|---|---|---|---|---|---|---|---|---|
| Example 3 | condensate of stearic acid amide and formaldehyde and carnauba wax | kaolin | oxidized starch, dialdehyde starch | 1,100–1,200 sec. | 90° C. | ◎ | ◎ | ◎ | 500 | ◎ |
| Example 4 | condensate of stearic acid amide and formaldehyde and carnauba wax | kaolin | oxidized starch dialdehyde starch | 500–550 sec- | 98° C. | ○ | Δ | ◎ | 400 | ◎ |
| Example 5 | condensate of stearic acid amide and formaldehyde and carnauba wax | kaolin | oxidized starch, dialdehyde starch | 300–400 sec. | 90° C. | ○ | Δ | (Δ) | 180 | Δ |

What is claimed is:

1. A heat-sensitive recording sheet, which comprises a support and a heat-sensitive layer formed thereon, said support being selected from the group consisting of paper, synthetic paper, synthetic resin film and metal-laminated paper, said heat-sensitive layer being coated on said support in an amount in the range of 4 to 10 g/m$^2$, calculated as the solids, said heat-sensitive layer consisting essentially of A. a color-developable substance which is normally colorless or light-colored, B. an organic acid substance which is capable of making said color-developable substance A develop a color when heated, characterized in that said heat-sensitive layer contains C. at least one member selected from the group of waxes consisting of condensate of higher fatty acid amide and formaldehyde having a melting point in the range of from 80° to 150° C. and condensate of higher fatty acid and ethylene diamine having a melting point in the range of from 80° to 150° C., and D. at least one member selected from the group of waxes consisting of vegetable waxes and montan wax, the amount of ingredient C being from 0.1 to 5.0 times the amount of ingredient A and the amount of ingredient D being from 0.2 to 6.0 times the amount of ingredient A, said heat-sensitive layer having a Beck's smoothness of from 100 seconds to 1,800 seconds.

2. A heat-sensitive recording sheet, which comprises a support and a heat-sensitive layer formed thereon, said support being selected from the group consisting of paper, synthetic paper, synthetic resin film and metal-laminated paper, said heat-sensitive layer being coated on said support in an amount in the range of 4 to 10 g/m$^2$, calculated as the solids, said heat-sensitive layer consisting essentially of A. a color-developable substance which is normally colorless or light-colored, B. an organic acid substance which is capable of making said color-developable substance A develop a color when heated and F. a binder, characterized in that said heat-sensitive layer contains C. at least one member selected from the group of waxes consisting of condensate of higher fatty acid amide and formaldehyde having a melting point in the range of from 80° to 150° C. and condensate of higher fatty acid and ethylene diamine having a melting point in the range of from 80° to 150° C., and D. at least one member selected from the group of waxes consisting of vegetable waxes and montan wax, the amount of ingredient C being from 0.1 to 5.0 times the amount of ingredient A and the amount of ingredient D being from 0.2 to 6.0 times the amount of ingredient A, and said binder F comprises a mixture of at least one member selected from the group consisting of starch and oxidized starch, mixed with dialdehyde starch, said binder having been applied in the form of an aqueous solution thereof, said heat-sensitive layer have a Beck's smoothness of from 100 seconds to 1,800 seconds.

3. A heat-sensitive recording sheet according to claim 1 or 2, in which said higher fatty acid for ingredient C is palmitic acid or stearic acid.

4. A heat-sensitive recording sheet according to claim 1 or 2, in which said ingredient D is carnauba wax or montan wax.

5. A heat-sensitive recording sheet according to claim 1 or 2, in which said heat-sensitive layer contains an inorganic filler E, selected from the group consisting of calcium carbonate, clay and mixtures thereof.

6. A heat-sensitive recording sheet according to claim 5, in which the amount of ingredient E is 0.5 to 5.0 times as much as the content of ingredient A.

7. A heat-sensitive recording sheet according to claim 2, in which the amount of ingredient F is from 10 to 50% by weight of the heat-sensitive layer.

8. A heat-sensitive recording sheet according to claim 1 or 2, in which the Beck's smoothness of the heat-sensitive layer surface is in the range of from 1,000 to 1,800 seconds.

9. A heat-sensitive recording sheet, which comprises: a support selected from the group consisting of paper, synthetic paper, synthetic resin film and metal-laminated paper; a heat-sensitive layer coated on said support in an amount in the range of from 4 to 10 g/m$^2$, calculated as the solids, said heat-sensitive layer consisting essentially of a mixture of A. a color-developable substance which is normally colorless or light-colored, B. an organic acid substance which is effective to make said color-developable substance A develop a color upon heating, C. at least one wax having a melting point in the range of from 80° to 150° C. and selected from the group consisting of (1) condensate of higher fatty acid amide and formaldehyde, and (2) condensate of higher fatty acid and ethylene diamine, D. at least one wax selected from the group consisting of carnauba wax, sugarcane wax, cotton wax and montan wax, E. at least one inorganic filler selected from the group consisting of clay, calcium carbonate, magnesium carbonate and kaolin, and F. a binder, wherein the weight ratio of C/A is 0.1/1.0 to 5.0/1.0, the weight ratio of D/A is 0.2/1.0 to 6.0/1.0, the weight ratio of E/A is 0.5/1.0 to 5.0/1.0, and the amount of F is from 10 to 50% by weight, based on the weight of said heat-sensitive layer, said heat-sensitive layer having a Beck's smoothness of from 100 seconds to 1,800 seconds.

10. A heat-sensitive recording sheet according to claim 9, in which said binder comprises a mixture of (1) a starch component selected from the group consisting of starch and oxidized starch, with (2) dialdehyde starch, said heat-sensitive layer having been prepared by dispersing ingredients A, B, C, D and E in an aqueous solution of said binder F, applying same to said support and then drying same, said heat-sensitive layer having a Beck's smoothness of from 1,000 to 1,800 seconds.

* * * * *